(12) United States Patent
Gallagher (10) Patent No.: US 6,591,005 B1
(45) Date of Patent: Jul. 8, 2003

(54) METHOD OF ESTIMATING IMAGE FORMAT AND ORIENTATION BASED UPON VANISHING POINT LOCATION

(75) Inventor: Andrew C. Gallagher, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/534,739

(22) Filed: Mar. 27, 2000

(51) Int. Cl.$^7$ .................................................. G06K 9/00
(52) U.S. Cl. ....................................... 382/154; 382/289
(58) Field of Search ................................. 382/154, 289, 382/199, 286, 276, 293, 106; 345/419, 427

(56) References Cited

U.S. PATENT DOCUMENTS

| | | | |
|---|---|---|---|
| 4,870,694 A | | 9/1989 | Takeo |
| 5,642,443 A | | 6/1997 | Goodwin et al. |
| 5,870,099 A | * | 2/1999 | Horii et al. ................. 345/427 |
| 5,990,900 A | * | 11/1999 | Seago ........................ 345/427 |
| 6,011,585 A | | 1/2000 | Anderson |
| 6,046,745 A | * | 4/2000 | Moriya et al. .............. 345/420 |

OTHER PUBLICATIONS

Lutton et al., "Contribution to the Determination of Vanishing Points Using Hough Transform," *IEEE Transactions on Pattern Analysis and Machine Intelligence*, vol. 16, No. 4, Apr. 1994, p. 430–438.
B. Brillault–O'Mahony, "New Method for Vanishing Point Detection," *CHGIP: Image Understanding*, vol. 54, No. 2, Sep. 1991, pp. 289–300.
S. T. Barnard, "Interpreting Perspective Images," *Artificial Intelligence*, Elsevier Science Publishers B. V. (North–Holland), 1983, pp. 435–462.
Burns et al., "Extracting Straight Lines," *IEEE Transactions on Pattern Analysis and Machine Intelligence*, vol. PAMI–8, No. 4, Jul. 1986, pp. 425–455.
McLean et al., "Vanishing Point Detection by Line Clustering," *IEEE Transactions on Pattern Analysis and Machine Intelligence*, vol. 17, No. 11, Nov. 1995, pp. 1090–1095.
Quan et al., "Determining perspective structures using hierarchical Hough transform," *Pattern Recognition Letters*, vol. 9, No. 4, 1989, pp. 279–286.
Collins et al., "Vanishing Point Calculation as a Statistical Inference on the Unit Sphere," *IEEE*, 1990, pp. 400–403.
J. Shufelt, "Performance Evaluation and Analysis of Vanishing Point Detection Techniques," *IEEE Transactions on Pattern Analysis and Machine Intelligence*, vol. 21, No. 3, Mar. 1999, pp. 282–288.
Kahn et al., "A Fast Line Finder for Vision–Guided Robot Navigation," *IEEE Transactions on Pattern Analysis and Machine Intelligence*, vol. 12, No. 11, Nov. 1990, pp. 1098–1102.
Magee et al., "Determining Vanishing Points from Perspective Images," *Computer Vision, Graphics, and Image Processing*, 26, 1984, pp. 256–267.

* cited by examiner

Primary Examiner—Timothy M. Johnson
Assistant Examiner—Ali Bayat
(74) Attorney, Agent, or Firm—Stephen H. Shaw (57) ABSTRACT

A method of determining the vertical axis of an image, including the steps of: detecting a set of vanishing points related to the image; selecting a vanishing point based on a predetermined criteria; and identifying the vertical axis with the selected vanishing point.

42 Claims, 5 Drawing Sheets

METHOD OF ESTIMATING IMAGE FORMAT AND ORIENTATION BASED UPON VANISHING POINT LOCATION

FIELD OF THE INVENTION

The invention relates generally to the field of estimating the format of an image (portrait or landscape). Additionally, the invention relates generally to the field of estimating the orientation (selection of the image side corresponding to the "up" direction relative to the photographer.)

BACKGROUND OF THE INVENTION

Conventional consumer cameras (both film and digital) capture an image having a rectangular imaging area that has one dimension longer than the other dimension. For cameras using 35 mm film, the horizontal dimension of the imaging area is about 36 mm and the vertical dimension of the imaging area is about 24 mm.

Generally, when a camera is in the upright position, the longer dimension of the imaging area is horizontal. If a photographer captures an image with the camera in the upright position, the top of the image generally corresponds to one of the two sides of the imaging area having a longer dimension. Images that have the top of the image corresponding to one of its longer two sides are referred to as "landscape formats." However, it is common for the photographer to rotate the camera 90 degrees to capture the photograph so as to achieve a more pleasing composition for certain subjects. Where this is the case, the top of the image then corresponds to one of the two sides with a shorter dimension; and the resulting image is referred to as having a "portrait format."

Determining whether an image is a portrait or a landscape has many possible practical implications. For example, auto-albuming applications, where album page layouts are automatically designed, require an allocation of page space that is related to whether an image is a portrait or a landscape. In addition, certain algorithms are used in an attempt to determine the orientation of an image based upon more than one frame in a consumer order. Having knowledge of whether a particular image within an order is a portrait or a landscape can be critical to these algorithms since it is very likely that all landscape scenes within a consumer order have a common orientation.

If the image orientation (i.e., which one of the four rectangular sides is "up" from the photographer's point of view) is known, then the portrait and landscape format is known. Knowledge of image orientation allows for the correct orientation of an image on an output display.

U.S. Pat. No. 5,642,443, issued Jun. 24, 1997 to Goodwin et al., entitled "Whole Order Orientation Method and Apparatus" describes a method of considering an entire set of images in a consumer's order to determine the orientation of an entire order. A statistical estimate of orientation is generated for each image in the set. A statistical estimate for the entire order is derived based upon the estimates for individual images in the set. Goodwin et al teach deriving relevant probabilities from spatial distributions of colors within the image. Goodwin et al must view an entire order of images rather than a single image. There are applications that only contain one image that Goodwin et al will be unable to correctly orient.

Also, U.S. Pat. No. 4,870,694, issued Sep. 26, 1989 to Takeo, entitled "Method of Determining Orientation of Image" describes a method of determining the orientation of an image that contains a representation of a human body. The position of the human is used as a clue to the orientation of the image. Takeo is primarily applicable to radiographic applications as used in hospitals or medical clinics. It is unlikely a broad-based consumer application, because it depends on certain constraints, such as requiring a human figure within the image.

Additionally, U.S. Pat. No. 6,011,585, issued Jan. 4, 2000 to Anderson, entitled "Apparatus and Method for Rotating the Display Orientation of a Captured Image" describes a method of determining image format and orientation based upon a sensor present in the camera at the time of image capture. However, if a sensor is not present in a particular camera or image-capturing device, the method of Anderson is not useful. The approach described by Anderson has the further disadvantage of requiring additional apparatus in the camera. Moreover, an image processing unit or operation will be unable to perform correct orientation unless the particular camera contained the additional apparatus.

Lutton et al. (in "Contribution to the Determination of Vanishing Points Using Hough Transform," *IEEE Trans. Pattern Analysis and Machine Intelligence*, Vol. 16, No. 4, pp. 430–438, Apr. 1994) attempts to detect the vertical direction of an image. The Lutton et al. article teaches one to select the direction that is orthogonal to the most directions in the scene. The implicit assumption is that the scene will contain many horizontal lines. However, this is not always the case. In addition Lutton determines a vertical direction based on an analysis of all lines in the scene, which can be time consuming. Also, this method must consider a slew of random image lines which may skew the result. Therefore, an image may contain format errors.

Consequently, there is a need for overcoming the above-described drawbacks. More specifically; a need exists for an improved method for accurately estimating the format and orientation of a digital image without using additional apparatus or introducing error into an algorithm.

SUMMARY OF THE INVENTION

The need is met according to the present invention by providing a method of determining the vertical axis of an image, including the steps of: detecting a set of vanishing points related to the image; selecting a vanishing point based on a predetermined criteria; and identifying the vertical axis with the selected vanishing point.

One advantage of the present invention is increasing the statistical probability of accurately determining the orientation of an image. An image can be thought of as having a format, i.e., "landscape," or "portrait"; or an orientation, (i.e., an "up" direction).

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a method. Those skilled in the art will readily recognize that the equivalent of such a method may also be constructed as hardware or software within the scope of the invention.

Note that the present invention describes a method of determining a format and an orientation for a digital image. The method of the present invention may operate in hardware or software residing in any number of devices. For example, the present invention may be performed on an image in a photographic copier, a digital camera, within a film scanner, on a personal computer, and the like. This description of the present invention is by no means intended to limit the possibility of devices in which the present invention may reside.

Figure 1:
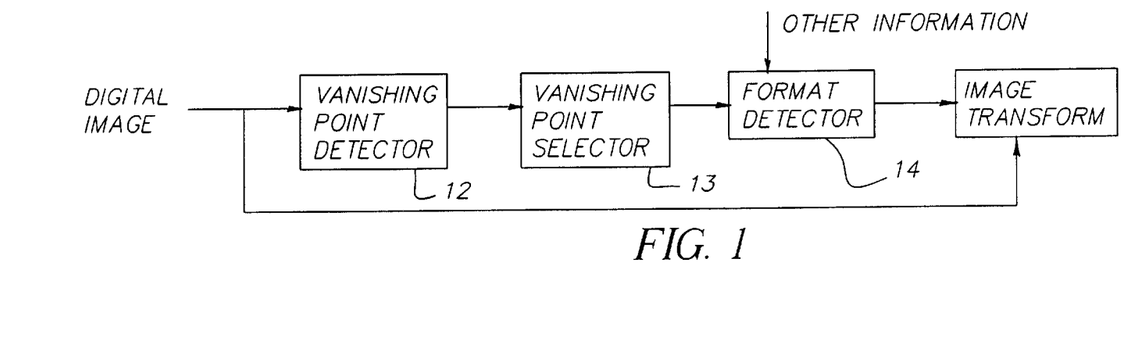
FIG. 1 is a schematic block diagram showing apparatus for practicing the method of the present invention.

FIG. 1 shows a block diagram of the present invention. The purpose of the present invention is to estimate the format of a digitized image. The source of the digitized image is of no matter to this invention. The digitized image may be a scan of a film negative, a scan of a photograph, or an image captured with a digital camera. It should be well understood that in cases where the digitized image is a scan of a hardcopy image that the format of the digitized image corresponds to the format of the source image. That is, if a photograph is in the landscape format, then the corresponding scan of that negative will also be in the same format. Thus, the method described herein may be used to automatically determine the format of a photograph, for example, by first digitizing the photograph and then analyzing the resulting scan with the method of the preferred embodiment. In this case, the source image is the photograph and the digital image is a result of the scan. It should be further understood that the source image may be a digital image, for example of large resolution. This source image may then be decimated to generate the digital image that the method of the present embodiment operates upon. Again, the result that the present invention determines applies to both the source image and the digital image that undergoes the method of the present invention. Note that the preferred embodiment is described with reference to digital images with dimensions 512 pixels by 768 pixels, although those skilled in the art will recognize that many image resolutions may be utilized with equal success. Again referring to FIG. 1, a digital image is input to a vanishing point detector 12. The purpose of the vanishing point detector is to identify the location of the vanishing points of the digital image.

As is well known in the art, a vanishing point is a result of the perspective projection of the three dimensional scene onto a two dimensional image plane. A vanishing point refers to the point in the image plane (a two dimensional projection of the three dimensional scene) where parallel lines on a 3-D object in the scene appear to meet. Vanishing points generally only have relevance for images containing images of a structure containing at least two line segments, generally from man-made structures. In addition, the vanishing point detector may consist of a manual identification of the vanishing points by using operator input. There are many techniques known in the art for detecting a vanishing point in an image. For example see the article by Lutton et al. cited above, using Hough Transforms to locate the vanishing points. A preferred automated technique is disclosed in U.S. Provisional Patent Application (EK Docket 80743) filed concurrently, entitled "Vanishing Point Detection by Training with Ground Truth Data", which is incorporated by reference.

Again referring to FIG. 1, the vanishing point detector outputs the locations of all vanishing points identified for the image. Typically, the number of vanishing points determined for a single image is not greater than three, although this should not be viewed as a limitation. The vanishing points determined for the image are output in the form of vanishing point vectors. Assuming that M vanishing points are determined for the digital image, the output of the vanishing point detector may be represented as $v_{Gm}$, where m ranges from 1 to M. Alternatively, it is possible that no vanishing points may be determined for the digital image. In this event, then the present invention can draw no conclusions regarding format or orientation from vanishing point location.

If M>0, then the vanishing point vectors detected by the vanishing point detector 12 are input to the vanishing point selector 13. The purpose of vanishing point selector 13 is to determine those vanishing points that may be useful for determining the format (i.e. the vertical axis) of the digital image by using the information contained in the M vanishing point vectors.

Vanishing points are a useful feature for determining the format of an image because of the preponderance of vertical parallel lines due to human construction. Despite the left to right position of the camera (or other image capture device,) the vanishing point associated with the vertical scene lines tend to fall near the vertical axis of the image. In fact, if the camera is constrained to only pivot up or down, the vanishing point associated with vertical scene lines must fall on the vertical axis of the image.

Figure 2:
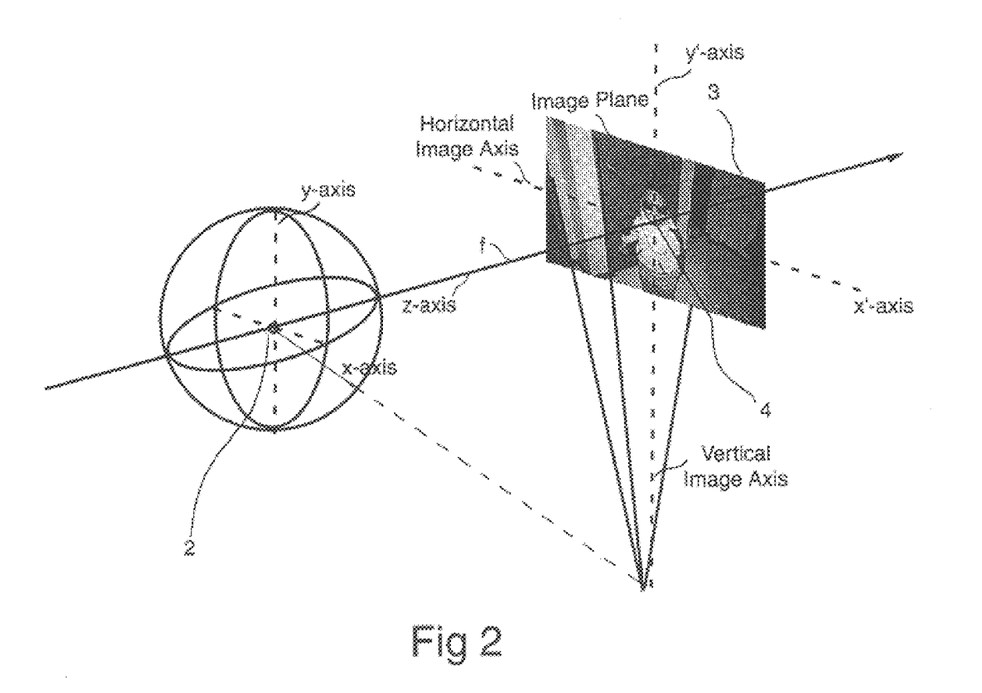
FIG. 2 is a diagram useful in describing the method of the present invention.

FIG. 2 shows a coordinate system useful in describing the present invention. A focal point 2, on the optical axis of a camera is located a distance f from the image plane 3. The focal point represents the origin of the Cartesian coordinate system. The x-axis and y-axis define the dimensionality of the image plane 3. The z-axis is also the optical axis of the system. The x'-axis and the y'-axis define a plane that is parallel to the image plane 3. The image origin 4 is defined as the point of intersection of the image plane with the Optical axis, and is given in Cartesian coordinates as (0,0, f). Generally, the image origin is assumed to be at the center of the distribution of pixels comprising the digital image, although that is not necessarily the case.

FIG. 2 illustrates that there are several ways that the vanishing point location may be expressed. First, a vanishing point may be expressed as a location on the image plane. For instance, with regard to the image shown in FIG. 2, the vanishing point v may be expressed as the point at location $v=(x_0, y_0, f)$ Such a representation of the vanishing point location performs well when the vanishing point is located near the image origin, however, the coordinate locations along the x-axis and the y-axis may grow quite large.

Also illustrated in FIG. 2 is a vanishing point representation scheme commonly used in the field of vanishing point detection. In this representation, a Gaussian mapping is used to represent the vanishing point location. Thus, each location v on the image plane has a unique location $v_G$ on the Gaussian sphere. With reference to FIG. 2, the image plane is positioned to be the distance f from the optical origin of the system. Typically the distance f is the focal length of a camera lens used to photograph the scene. If the focal length is unknown, then a reasonable guess may be used. In the preferred embodiment, the distance f is the diagonal length of the imager. In the case of the images with dimension 512 pixels by 768 pixels, the distance f is set equal to 923. The vanishing point on the image plane may then be represented as the unit vector that points from the optical system origin to the vanishing point on the image plane. This vector is of length one and may be described as the coordinates of the intersection of a Gaussian sphere (a sphere of radius 1.0) centered at the optical system origin (the focal point) and the line passing through both the optical system origin and the vanishing point on the image plane. This vector representation of the vanishing point is advantageous because it contains the entire space of the image plane. If the vanishing point location in the image plane $v=(x_0,y_0,f)$ is known, then the vanishing point vector may be determined by the following Gaussian mapping:

$$v_G = \frac{v}{|v|}$$

Likewise, if the vanishing point vector $v_G$ ($x_G$, $y_G$, $z_G$) is known and the vanishing point location in the image plane is desired, then the following projection is used:

$$v = \frac{fv_G}{z}$$

In the preferred embodiment, the vanishing point vector is interchangeable with the vanishing point location given in Cartesian coordinates. Those skilled in the art of image processing will recognize that the operations to be described with reference to vanishing point vectors may easily be translated to operations with reference to vanishing point location given in Cartesian coordinates.

In human construction, there are also a large number of horizontal lines (lines orthogonal to the vertical lines.) If these horizontal lines happen to be parallel to the image plane (orthogonal to the optical axis), then a vanishing point for the horizontal lines will occur at infinity on the horizontal axis of the image. However, depending upon the position of the photographer, it is very likely that the horizontal scene lines will not be parallel to the image plane. If this condition exists and the camera is tilted about the x-axis, then the vanishing point associated with the horizontal scene lines will not necessarily fall on either axis of the image plane. Thus, the vanishing point associated with horizontal lines in the scene may fall on the horizontal axis of the image, but because of the scene composition it is very likely that the vanishing point will fall elsewhere. The result is that very little may be guessed about the vanishing point location of horizontal lines in the scene, but a great deal may be guessed about the vanishing point associated with the vertical lines of a scene.

A ground truth analysis of vanishing points confirms these statements. Note that a vanishing point vector may be converted to two angles, $\phi$ and $\theta$. These angles are calculated as follows:

$\phi = \cos^{-1}(z_G)$ $\theta = \tan^{-1}(y_G/x_G)$

Note that the angle $\theta$ is unwrapped so that its value is between 0 and $2\pi$. For example, a vanishing point vector of (0.05, −0.86, 0.51) has values of $\phi=1.0356$ radians and $\theta=4.7705$ radians. The angle $\phi$ is the angle from the optical axis to the vanishing point vector, and ranges from 0 (when the vector falls directly on the optical axis and points to the image center) to $\pi/2$ (when the vector is orthogonal to the optical axis and intersects with the image plane at infinity.)

The angle $\theta$ is the angle between the projection of the vector onto the xy-plane and the positive x-axis. Assuming that top of the image is placed on the positive y'-axis, vanishing point vectors which have $\theta=0$ radians correspond to the vanishing point along the right side of the horizontal axis of the image, and vanishing point vectors which have $\theta=\pi/2$ correspond to the vanishing point along the upper (positive) portion of the vertical axis of the image, etc. Again with regard to FIG. 1, the vanishing point selector 13 determines if any of the M vanishing points associated with the digital image may be used to determine the format of the digital image. Those vanishing points which may be used to determine the format of the image are referred to as "format candidate vanishing points."

Figures 3A, 3B, 3C:
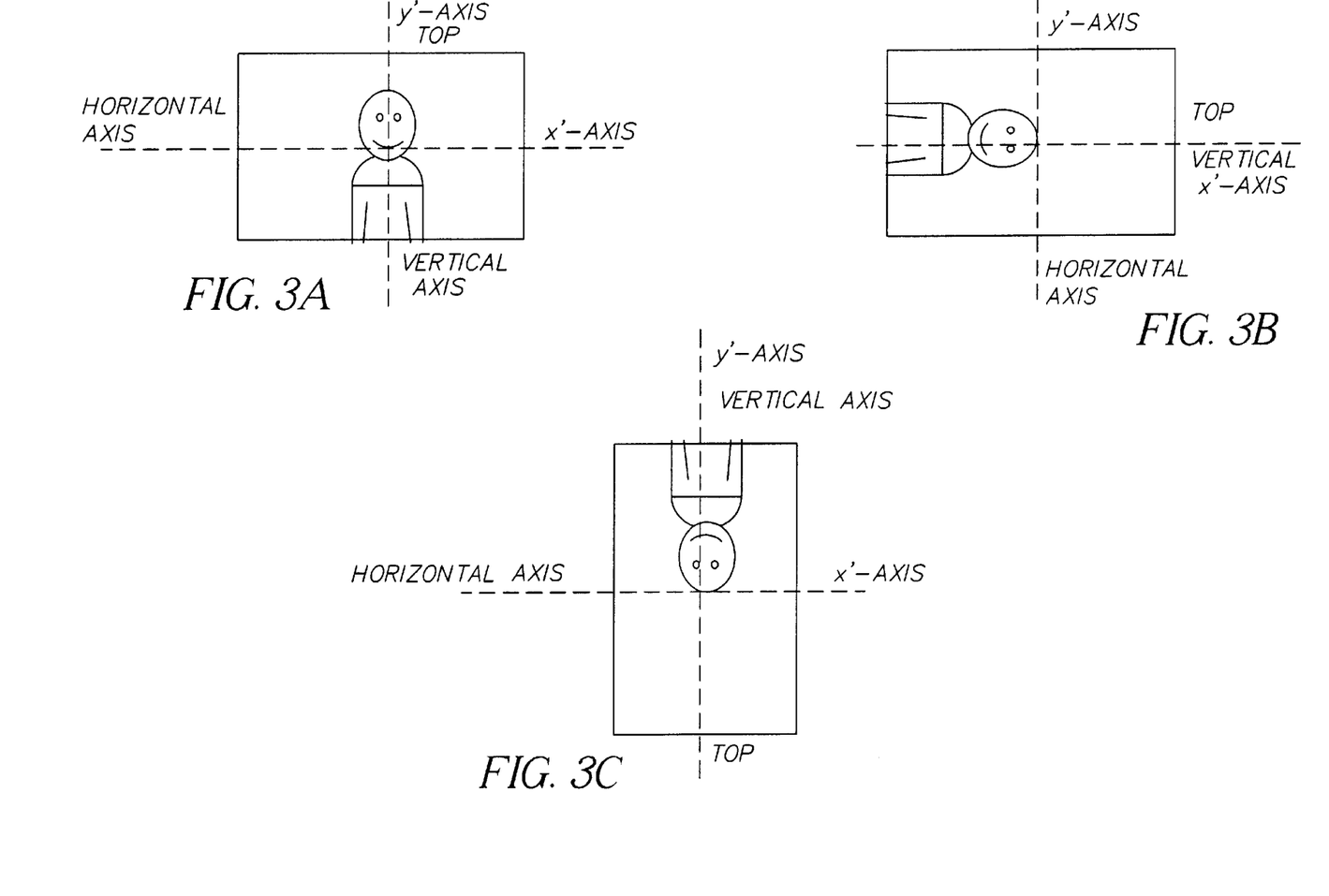
FIG. 3A–C show an image having various formats and orientations.

FIG. 3 shows several image examples useful for defining terms used herein. FIG. 3A shows an example image of a person. The top of the image is defined as the side of the image that was in the "up" direction from the photographer's perspective at the time of image capture. Identification of the top of an image solves the problem of orientation. In the case of FIG. 3A, the top of the image clearly corresponds to the top of the subject's head. Note that the bottom of an image is always the image side opposite the image top. Also shown in FIG. 3A are axes parallel to the x-axis and the y-axis passing through the image origin. These axes shall herein be referred to as the x'-axis, and the y'-axis, respectively.

Note that the vertical axis of the image is that line that passes through the top and bottom of the image, as well as the image origin and is coincident with either the x'-axis or the y'-axis. The vertical axis of the image defines the format of the image, by specifying which two sides are top and bottom. As used herein, the term "format" is associated with the identity of the vertical axis of the image. However, the vertical axis of the image does not specify which of the two sides is the top, thus the orientation of an image may remain unknown even when the format is known. Note in the case of the image in FIG. 3A, the y'-axis is the vertical axis of the image.

FIG. 3B shows an example where the top of the image is the right image side. In this case, the vertical axis of the image is the x'-axis. Finally, FIG. 3C shows an example image where, like the image in FIG. 3A, the vertical axis of the image is the y'-axis. However, in this case the top of the image lies on the negative y'-axis.

Generally, images are rectangular in shape. When the vertical axis of the image corresponds to the shorter of the two image dimensions, the image is said to have a format of landscape, as shown in FIG. 3A. When the vertical axis of the image corresponds to the longer of the two image dimensions, the image is said to have a format of portrait, as shown in FIGS. 3B and 3C. If the two image dimensions are equivalent in length (a square), then the image is neither a portrait nor landscape. However, the format of a square image can still be said to be defined by the vertical axis of the image.

Figure 4:
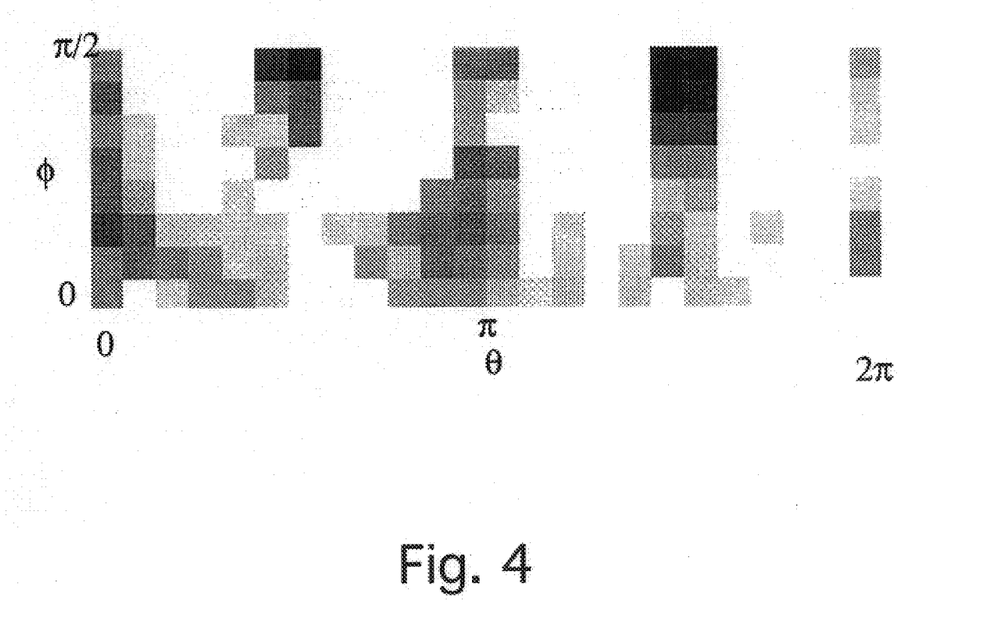
FIG. 4 is a two dimensional histogram of data used to illustrate the basis of the present invention.

FIG. 4 shows an image of the histogram of the angles $\phi$ and $\theta$ for 294 vanishing point vectors manually determined from 352 images. (Each image was positioned in the upright orientation. That is, the vertical axis of the image is parallel to the y-axis. In addition, the "top" of the image is in the direction of the positive y-axis.) In this representation, the darker bins represent bins that contain more counts, and white represents a bin receiving 0 counts. The peaks at high values of $\phi$ occur at values of $\theta$ of $\{0, \pi/2, \pi, 3\pi/2\}$. This indicates that vanishing points far from the image center tend to occur near one of the two image axes. Additionally, since the peaks at $\theta=\{\pi/2, 3\pi/2\}$ are much stronger than the peaks at $\theta=\{0, \pi\}$, it follows that, given a vanishing point is far from the image center, the vanishing point is far more likely to fall on the vertical axis of the image than on the horizontal axis of the image. Thus, this information may be utilized to determine the format of an image.

In the preferred embodiment of the present invention, a format candidate vanishing point is any vanishing point having as associated vanishing point vector $v_G=(x_G, y_G, z_G)$ meeting the either, of the following two conditions:

1. $|x_G|<T_1$ and $|y_G|>T_2$

2. $|y_G|<T_1$ and $|x_G|>T_2$

Figure 6:
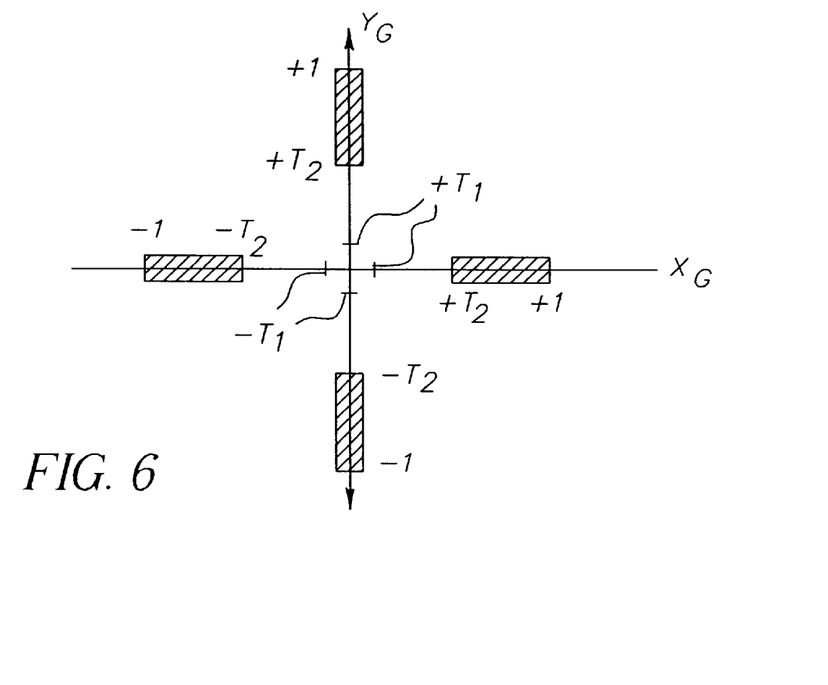
FIG. 6 is a diagram useful in describing the present invention.

Typically, $0.1<T_1<0.02$ and $0.2<T_2<0.95$. In the preferred embodiment, $T_1$ is set at 0.05 and $T_2$ is equal to 0.55. The threshold $T_2$ ensures that $\phi>0.52$ radians or 33.3 degrees. The vanishing point selector 13 outputs N (where N is between 0 and M) format candidate vanishing points. The regions the $x_G$, $y_G$ plane in which such vanishing points lie are illustrated by cross hatching in FIG. 6. As can be seen from FIG. 6, threshold $T_1$ serves to detect vanishing points that are near to the horizontal or vertical axes, and threshold $T_2$ serves to detect vanishing points that are far from the center of the image.

Alternatively, the vertical axis can be determined by testing to see if the vanishing point is a predetermined distance from the center of the image. This occurs if the vanishing point vector meets the following criteria:

$$\sqrt{x_G^2+y_G^2}\geq T.$$

If an image has either 0 or more than one format candidate vanishing points (if N=0 or N>1, then the present invention does not detect the format or orientation of the digital image using a feature based on vanishing point location. If there is exactly one format candidate vanishing point corresponding to the digital image, then the format candidate vanishing point is output from the vanishing point selector 13 and input to the format detector 14. Note that other information may also be input to the format detector 14 in order to aid the determination process. For instance color cues similar to those described by Goodwin in U.S. Pat. No. 5,642,443 noted above, may also be input to the format detector 14 for the purpose of determining the digital image format. The operation of the format detector 14 is to determine the format (the vertical axis of the image) of the digital image from the format candidate vanishing point. The format of the image is determined to be the axis that the format candidate vanishing point is nearest to. For instance, if the format candidate vanishing point met condition 1 described herein above ($|x_G|<T_1$ and $|y_G|>T_2$), then the vertical axis of the image is determined to be the x'-axis. Likewise, if the format candidate vanishing point met condition 2 described herein above ($|y_G|<T_1$ and $|x_G|>T_2$), then vertical axis of the image is determined to be the y'-axis. If the pixel dimensions of the digital image are known and the digital image is not square in dimension, then the format of the digital image may be further identified as "portrait" or "landscape" as described herein above.

As a testament to the utility and accuracy of this invention, 352 images were processed. Of these 352 images, 132 (37.5%) had a single format candidate vanishing point. Of the 132 images for which the method of the current invention was able to estimate the format, the algorithm estimated 87 of the images were landscape images and 45 were portrait. Of the 87 estimated landscape images, the algorithm was correct for 86. Of the 45 estimated portrait images, the algorithm was correct for 25. Thus the algorithm was correct 84.1% of the time. Note that of the 132 images for which the method of the invention was applied, there were 26 portraits and 108 landscapes. The prior probability of an image being landscape among the 132 images was 81.2%. Thus, the method of the present invention has a superior performance to simply guessing landscape for each digital image.

Returning to FIG. 1, the output of the format detector 14 is an identifier of the digital image format (the vertical axis of the image). In addition, the further classification of the image may be output by the format detector 14 identifying whether the digital image is a portrait or landscape. This information may be used in further image processing steps. FIG. 1 shows that the identification of the vertical axis of the digital image is output from the format detector 14 and passed to an image transform 19. This image transform may also receive various other parameters as inputs, including the digital image itself. The operation of the image transform 19 may be any number of image transformations that benefit from knowledge of image format.

Figure 5:
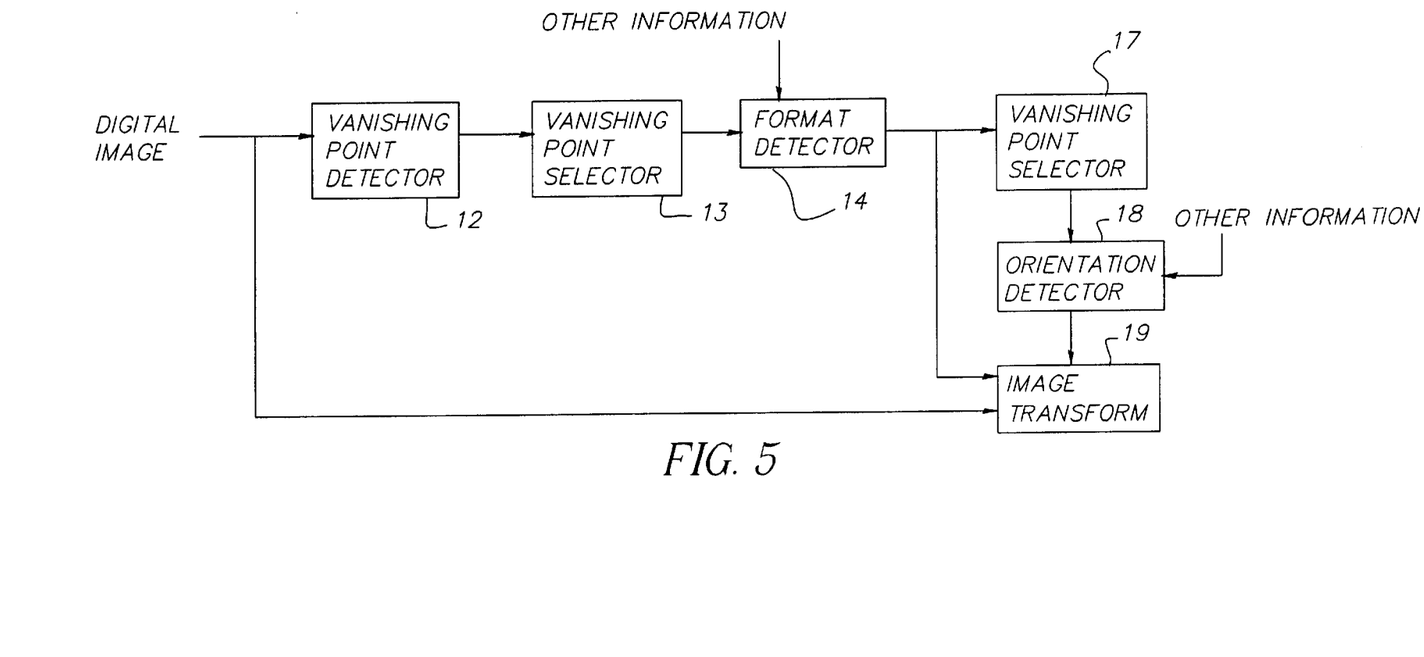
FIG. 5 is a block diagram of a further embodiment of the present invention.

In an example of the utility of the format information, the format of the digital image may be stored as metadata by the image transform 19. Metadata is generally defined as data corresponding to an image apart from actual pixel values. With regard to FIG. 5, both the format and orientation of the digital image may be determined with the format candidate vanishing point in some cases. As shown in FIG. 5, if the format of an image is determined to be a landscape image, then the format candidate vanishing point is passed to another vanishing point selector 17. This vanishing point selector 17 determines if a vanishing point is an orientation candidate vanishing point. Note that the ground truth data of FIG. 4 shows that when the vanishing point is on the vertical axis of the image ($\theta=\{\pi/2, 3\pi/2\}$), that the vanishing point is more likely to be on the negative vertical axis of the image than the positive. This is a result of the fact that (at least for landscape images), it is more common for the photographer to tilt the camera downward than up when capturing the image. Any vanishing point determined to be a orientation candidate vanishing point is output to the orientation detector 18. The purpose of the orientation detector 18 is to determine which side of the digital image is in the "up" direction relative to the photographer at the time of image capture. To this end, the orientation detector 18 determines that the "down" direction is the direction toward the format candidate vanishing point.

Figure 7:
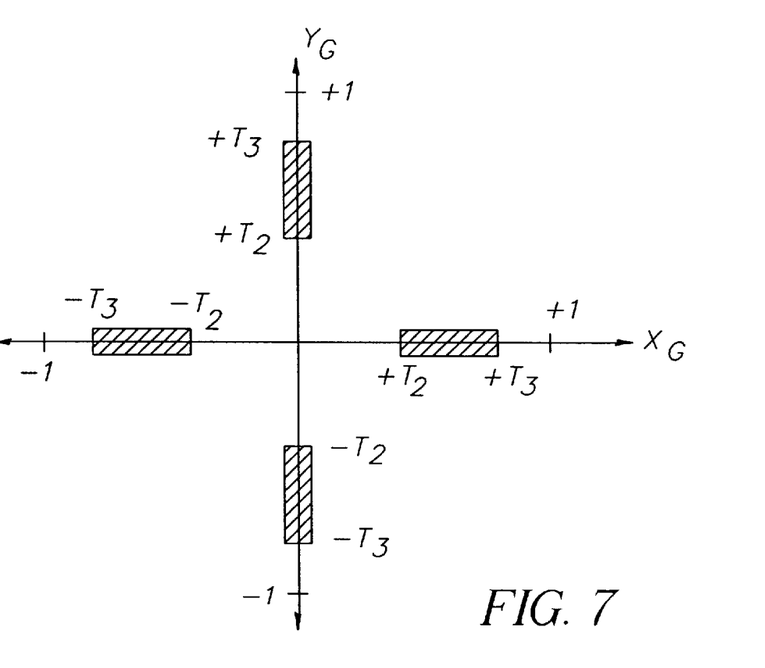
FIG. 7 is a diagram useful in describing the present invention.

Again with regard to FIG. 5, the vanishing point selector 17 first determines whether a format candidate vanishing point is also an orientation candidate vanishing point. An orientation candidate vanishing point is a format candidate vanishing point that is not too far from the image center. In the preferred embodiment, a format candidate vanishing point is a vanishing point for which both $|y_G|<T_3$ and $|x_G|<T_3$. The regions in the $x_G$, $y_G$ plane where orientation candidate vanishing points lie are illustrated by cross hatching in FIG. 7. Typically $0.8<T_3<0.999$. In the preferred embodiment, $T_3=0.95$. Format candidate vanishing points that are not orientation candidate vanishing points are sufficiently close to infinity and indicate that the camera was nearly close to being level with respect to the vertical lines in the scene (i.e. both the x-axis and the optical axis are orthogonal to vertical lines in the scene). In this case, the format candidate vanishing point does not provide enough clues to estimate the orientation of the digital image. The vanishing point selector 17 outputs P orientation candidate vanishing points (where P>=0, P<=N<=M.)

If P=1, then the orientation candidate vanishing point is input to the orientation detector 18, which then determines the orientation of the digital image based upon the orientation candidate vanishing point. Note that other information may also be input to the orientation detector 18 in order to aid the determination process. For instance color cues similar to those described by Goodwin may also be input to the orientation detector 18 for the purpose of determining the digital image orientation. If P is not equal to one, then the orientation of the digital image may not be determined by the method of the present invention. The orientation detector 18 operates as follows:

If $|x_G|<T_1$ and $y_G>T_2$, then the negative y'-axis is determined to be at the top of the image.

If $|x_G|<T_1$ and $y_G<-T_2$, then the positive y'-axis is determined to be at the top of the image.

If $|y_G|<T_1$ and $x_G>T_2$, then the negative x'-axis is determined to be at the top of the image.

If $|y_G|<T_1$ and $x_G<-T_2$, then the positive x'-axis is determined to be at the top of the image.

As a testament to the utility of this approach, for the 86 landscape images with exactly one format candidate vanishing point, the orientation was estimated for 33 of these images. Of these 33 images, the estimated orientation was correct 27 times (~82%.) The orientation detector 18 outputs information concerning the orientation of the digital image.

The estimated orientation of the digital image along with the digital image may be input to an image transform 19 which utilizes the orientation information. This image transform 19 may also input the digital image, as well as other parameters or images. For example the image transform 19 may rotate the image until the top of the image is in the upright position (the positive y'-axis). Such a image transform would require a digital image rotation of 0, 90, 180, or 270 degrees. Such a rotation is well known in the prior art and will not be further discussed. In another example of the utility of the orientation information, the orientation of the digital image may be stored as metadata by the image, transform 19.

Those skilled in the art will recognize that many variations may be made to the description of the present invention without significantly deviating from the scope of the present invention. For instance, in the present invention the format detector 14 is described as determining the format of the digital image only when the digital image has a single format candidate vanishing point. However, it would be trivial to modify the rules described herein such that a format may be determined for an image with multiple format candidate vanishing points with a weighting factor designed to designate the value of the individual vanishing points.

The invention has been described in detail with particular reference to certain preferred embodiments thereof, but it will be understood that variations and modifications can be effected within the spirit and scope of the invention.

| PARTS LIST | |
|---|---|
| 2 | focal point |
| 3 | image plane |
| 4 | image origin |
| 12 | vanishing point detector |
| 13 | vanishing point selector |
| 14 | format detector |
| 17 | vanishing point selector |
| 18 | orientation detector |
| 19 | image transform |

What is claimed is:

1. A method of determining the vertical axis of an image, comprising the steps of:
   a) detecting a set of vanishing points related to the image;
   b) selecting a vanishing point based on a predetermined criteria of the image; and
   c) identifying the vertical axis with the selected vanishing point;
   wherein the predetermined criteria is a threshold operation to select a vanishing point that is greater than a predetermined distance from the center of the image.

2. The method claimed in claim 1, wherein the image has x' and y' axes and the predetermined criteria is:

$|x_G|<T_1$ and $|y_G|>T_2$;

OR $|y_G|<T_1$ and $|y_G|>T_2$ where the vanishing points are represented by vanishing point vectors $v_G=(x_G, y_G, z_G)$ with relation to a Gaussian sphere located on a z-axis with respect to the image at a distance f away from the image plane, f representing an approximation of the focal length of a camera lens employed to photograph the image; and $T_1$ and $T_2$ are predetermined constants.

3. The method claimed in claim 2, wherein $0.01<T_1<0.2$ and $0.2<T_2<0.95$.

4. The method claimed in claim 3, wherein $T_1=0.05$ and $T_2=0.55$.

5. A computer readable medium having computer executable instructions for performing the method of claim 4.

6. A computer readable medium having computer executable instructions for performing the method of claim 2.

7. A computer readable medium having computer executable instructions for performing the method of claim 3.

8. The method claimed in claim 1, wherein the image has x'-axis and y'-axis and wherein the predetermined criteria is a threshold operation to select a vanishing point that is close to one of the axes of the image.

9. A computer readable medium having computer executable instructions for performing the method of claim 8.

10. The method claimed in claim 1, further comprising the step of detecting the orientation of the image based on the selected vanishing point location.

11. The method claimed in claim 10, wherein the image has x' and y' axes and the predetermined criteria is:

If $|x_G|<T_1$ and $y_G>T_2$, then the negative y'-axis is determined to be at the top of the image;

If $|x_G|<T_1$ and $y_G<-T_2$, then the positive y'-axis is determined to be at the top of the image;

If $|y_G|<T_1$ and $x_G>T_2$, then the negative x'-axis is determined to be at the top of the image; and If $|y_G|<T_1$ and $x_G<-T_2$, then the positive x'-axis is determined to be at the top of the image, where the vanishing points are represented by vanishing point vectors $v_G=(x_G, y_G, z_G)$ with relation to a Gaussian sphere located on a z-axis with respect to the image at a distance f away from the image plane, f representing an approximation of the focal length of a camera lens employed to photograph the image; and $T_1$ and $T_2$ are predetermined constants.

12. The method claimed in claim 11, wherein $0.01<T_1<0.2$ and $0.2<T_2<0.95$.

13. The method claimed in claim 12, wherein $T_1=0.05$ and $T_2=0.55$.

14. A computer readable medium having computer executable instructions for performing the method of claim 13.

15. A computer readable medium having computer executable instructions for performing the method of claim 10.

16. A computer readable medium having computer executable instructions for performing the method of claim 11.

17. A computer readable medium having computer executable instructions for performing the method of claim 12.

18. The method claimed in claim 1, wherein the image is rectangular and further comprising the step of identifying the format of the image based on the relation of the vertical axis to the rectangular axes of the image.

19. A computer readable medium having computer executable instructions for performing the method of claim 18.

20. The method claimed in claim 1, wherein the image has x' and y' axes and the predetermined criteria is:

$$|x_G|<T_1 \text{ and } T_2<|y_G|<T_3;$$

OR $$|y_G|<T_1 \text{ and } T_2<|x_G|<T_3;$$

where the vanishing points are represented by vanishing point vectors $v_G=(x_G, y_G, z_G)$ with relation to a Gaussian sphere located on a z-axis with respect to the image at a distance f away from the image plane, f representing an approximation of the focal length of a camera lens employed to photograph the image; and $T_1$ and $T_2$ are predetermined constants, whereby both the format and orientation of the image can be determined.

21. The method claimed in claim 20, wherein:

If $|x_G|<T_1$ and $y_G>T_2$, then the negative y'-axis is determined to be at the top of the image;

If $|x_G|<T_1$ and $y_G<-T_2$, then the positive y'-axis is determined to be at the top of the image;

If $|y_G|<T_1$ and $x_G>T_2$, then the negative x'-axis is determined to be at the top of the image; and If $|y_G|<T_1$ and $x_G<-T_2$, then the positive x'-axis is determined to be at the top of the image, where the vanishing points are represented by vanishing point vectors $v_G=(x_G, y_G, z_G)$ with relation to a Gaussian sphere located on a z-axis with respect to the image at a distance f away from the image plane, f representing an approximation of the focal length of a camera lens employed to photograph the image; and $T_1$ and $T_2$ are predetermined constants.

22. A computer readable medium having computer executable instructions for performing the method of claim 21.

23. The method claimed in claim 20, wherein $0.01<T_1<0.2$ and $0.2<T_2<0.95$ and $0.8<T_3<0.999$.

24. A computer readable medium having computer executable instructions for performing the method of claim 23.

25. The method claimed in claim 20, wherein $T_1=0.05$ and $T_2=0.55$ and $T_3=0.95$.

26. A computer readable medium having computer executable instructions for performing the method of claim 25.

27. A computer readable medium having computer executable instructions for performing the method of claim 20.

28. A computer readable medium having computer executable instructions for performing the method of claim 1.

29. Apparatus for determining the vertical axis of an image, comprising the steps of:

a) means for detecting a set of vanishing points related to the image;

by means for selecting a vanishing point based on a predetermined criteria of the image; and c) means for identifying the vertical axis with the selected vanishing point;

wherein the predetermined criteria is a threshold operation to select a vanishing point that is greater than a predetermined distance from the center of the image.

30. The apparatus claimed in claim 28, wherein the image has x' and y' axes and the predetermined criteria is:

$$|x_G|<T_1 \text{ and } |y_G|>T_2;$$

OR $$|y_G|<T_1 \text{ and } |x_G|>T_2$$

where the vanishing points are represented by vanishing point vectors $v_G=(x_G, y_G, z_G)$ with relation to a Gaussian sphere located on a z-axis with respect to the image at a distance f away from the image plane, f representing an approximation of the focal length of a camera lens employed to photograph the image; and $T_1$ and $T_2$ are predetermined constants.

31. The apparatus claimed in claim 30, wherein $0.01<T_1<0.2$ and $0.2<T_2<0.95$.

32. The apparatus claimed in claim 31, wherein $T_1=0.05$ and $T_2=0.55$.

33. The apparatus claimed in claim 29, wherein the image has x'-axis and y'-axis and wherein the predetermined criteria is a threshold operation to select a vanishing point that is close to one of the axes of the image.

34. The apparatus claimed in claim 29, further comprising the step of detecting the orientation of the image based on the selected vanishing point location.

35. The apparatus claimed in claim 34, wherein the image has x' and y' axes and the predetermined criteria is:

If $|x_G|<T_1$ and $y_G>T_2$, then the negative y'-axis is determined to be at the top of the image;

If $|x_G|<T_1$ and $y_G<-T_2$, then the positive y'-axis is determined to be at the top of the image;

If $|y_G|<T_1$ and $x_G>T_2$, then the negative x'-axis is determined to be at the top of the image; and If $|y_G|<T_1$ and $x_G<-T_2$, then the positive x'-axis is determined to be at the top of the image, where the vanishing points are represented by vanishing point vectors $v_G=(x_G, y_G, z_G)$ with relation to a Gaussian sphere located on a z-axis with respect to the image at a distance f away from the image plane, f representing an approximation of the focal length of a camera lens employed to photograph the image; and $T_1$ and $T_2$ are predetermined constants.

36. The apparatus claimed in claim 35, wherein $0.01 < T_1 < 0.2$ and $0.2 < T_2 < 0.95$.

37. The apparatus claimed in claim 36, wherein $T_1 = 0.05$ and $T_2 = 0.55$.

38. The apparatus claimed in claim 29, wherein the image is rectangular and further comprising the step of identifying the format of the image based on the relation of the vertical axis to the rectangular axes of the image.

39. The apparatus claimed in claim 29, wherein the image has x' and y' axes and the predetermined criteria is:

$$|x_G| < T_1 \text{ and } T_2 < |y_G| < T_3;$$

OR $$|y_G| < T_1 \text{ and } T_2 < |x_G| < T_3;$$

where the vanishing points are represented by vanishing point vectors $v_G = (x_G, y_G, z_G)$ with relation to a Gaussian sphere located on a z-axis with respect to the image at a distance f away from the image plane, f representing an approximation of the focal length of a camera lens employed to photograph the image; and $T_1$ and $T_2$ are predetermined constants, whereby both the format and orientation of the image can be determined.

40. The apparatus claimed in claim 39, wherein:

If $|x_G| < T_1$ and $y_G > T_2$, then the negative y'-axis is determined to be at the top of the image;

If $|x_G| < T_1$ and $y_G < -T_2$, then the positive y'-axis is determined to be at the top of the image;

If $|y_G| < T_1$ and $x_G > T_2$, then the negative x'-axis is determined to be at the top of the image; and If $|y_G| < T_1$ and $x_G < -T_2$, then the positive x'-axis is determined to be at the top of the image, where the vanishing points are represented by vanishing point vectors $v_G = (x_G, y_G, z_G)$ with relation to a Gaussian sphere located on a z-axis with respect to the image at a distance f away from the image plane, f representing an approximation of the focal length of a camera lens employed to photograph the image; and $T_1$ and $T_2$ are predetermined constants.

41. The apparatus claimed in claim 39, wherein $0.01 < T_1 < 0.2$ and $0.2 < T_2 < 0.95$ and $0.8 < T_3 < 0.999$.

42. The apparatus claimed in claim 39, wherein $T_1 = 0.05$ and $T_2 = 0.55$ and $T_3 = 0.95$.

* * * * *

UNITED STATES PATENT AND TRADEMARK OFFICE
CERTIFICATE OF CORRECTION

PATENT NO. : 6,591,005 B1
DATED : July 8, 2003
INVENTOR(S) : Andrew C. Gallagher It is certified that error appears in the above-identified patent and that said Letters Patent is hereby corrected as shown below:

Column 7,
Line 17, delete equation " $1. \ |x_G| < T_1 \ and \ |y_G| > T_2$ " and insert equation -- $1. \ |x_G| < T_1 \ and \ |y_G| > T_2$ --.

Line 20, delete "Typically, 0.1" and insert -- Typically, 0.01 --.

Line 35, delete equation " $\sqrt{x_G^2 + y_G} > T_2$ " and insert equation -- $\sqrt{x_G^2 + y_G^2} > T_2$ --.

Column 10,
Line 27, delete first equation " $|x_G| < T_1 \ and \ |y_G| > T_2$ " and insert equation -- $|x_G| < T_1 \ and \ |x_G| > T_2$ --.

Column 12,
Line 26, delete "28" and insert -- 29 --.

Signed and Sealed this

Seventh Day of February, 2006

JON W. DUDAS
*Director of the United States Patent and Trademark Office*